United States Patent
Habermann et al.

(10) Patent No.: US 9,959,155 B2
(45) Date of Patent: *May 1, 2018

(54) TESTING A DATA COHERENCY ALGORITHM

(71) Applicant: INTERNATIONAL BUSINESS MACHINES CORPORATION, Armonk, NY (US)

(72) Inventors: Christian Habermann, Boeblingen (DE); Gerrit Koch, Ammerbuch (DE); Martin Recktenwald, Schoenaich (DE); Ralf Winkelmann, Holzgerlingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/197,534

(22) Filed: Jun. 29, 2016

(65) Prior Publication Data

US 2017/0220439 A1    Aug. 3, 2017

Related U.S. Application Data

(63) Continuation of application No. 15/010,088, filed on Jan. 29, 2016.

(51) Int. Cl.
*G06F 11/00* (2006.01)
*G06F 11/07* (2006.01)
(Continued)

(52) U.S. Cl.
CPC ........ *G06F 11/0724* (2013.01); *G06F 11/141* (2013.01); *G06F 11/1474* (2013.01);
(Continued)

(58) Field of Classification Search
CPC ............... G06F 11/0724; G06F 11/141; G06F 11/1474; G06F 11/263; G06F 11/0815; G06F 11/0897
See application file for complete search history.

(56) References Cited

U.S. PATENT DOCUMENTS 7,774,440 B1 *  8/2010  Bagrodia ............ H04L 41/0816
                                                    703/1
8,095,824 B2    1/2012  Gray et al.
(Continued)

FOREIGN PATENT DOCUMENTS

DE         10253137 A1    6/2003

OTHER PUBLICATIONS

Office Action for U.S. Appl. No. 15/010,088 dated Jul. 7, 2017, pp. 1-9.
(Continued)

*Primary Examiner* — Charles Ehne
(74) *Attorney, Agent, or Firm* — Margaret McNamara, Esq.; Blanche E. Schiller, Esq.; Heslin Rothenberg Farley & Mesiti P.C.

(57) ABSTRACT

Testing a data coherency algorithm of a multi-processor environment. The testing includes implementing a global time incremented every processor cycle and used for timestamping; implementing a transactional execution flag representing a processor core guaranteeing the atomicity and coherency of the currently executed instructions; implementing a transactional footprint, which keeps the address of each cache line that was used by the processor core; implementing a reference model, which operates on every cache line and keeps a set of timestamps for every cache line; implementing a core observed timestamp representing a global timestamp, which is the oldest construction date of data used before; implementing interface events; and reporting an error whenever a transaction end event is detected and
(Continued)

any cache line is found in the transactional footprint with an expiration date that is older than or equal to the core observed time.

13 Claims, 5 Drawing Sheets

(51) Int. Cl.
| | | |
|---|---|---|
| *G06F 12/0808* | (2016.01) | |
| *G06F 12/0811* | (2016.01) | |
| *G06F 12/0815* | (2016.01) | |
| *G06F 12/0842* | (2016.01) | |
| *G06F 12/0875* | (2016.01) | |
| *G06F 12/0891* | (2016.01) | |
| *G06F 12/0897* | (2016.01) | |
| *G06F 11/22* | (2006.01) | |
| *G06F 11/14* | (2006.01) | |
| *G06F 11/26* | (2006.01) | |

(52) U.S. Cl.
CPC ........ *G06F 11/2242* (2013.01); *G06F 11/261* (2013.01); *G06F 12/0808* (2013.01); *G06F 12/0811* (2013.01); *G06F 12/0815* (2013.01); *G06F 12/0842* (2013.01); *G06F 12/0875* (2013.01); *G06F 12/0891* (2013.01); *G06F 12/0897* (2013.01); *G06F 2212/1032* (2013.01); *G06F 2212/452* (2013.01); *G06F 2212/6042* (2013.01); *G06F 2212/621* (2013.01)

(56) References Cited

U.S. PATENT DOCUMENTS

| | | |
|---|---|---|
| 8,108,197 B2 | 1/2012 | Habermann et al. |
| 8,676,560 B2 * | 3/2014 | Kajitani .............. G06F 17/5022 703/13 |
| 8,706,982 B2 | 4/2014 | Saha et al. |
| 9,477,481 B2 | 10/2016 | Gschwind et al. |
| 9,658,961 B2 | 5/2017 | Gschwind et al. |
| 2007/0067573 A1 * | 3/2007 | Bruening .............. G06F 9/3851 711/125 |
| 2009/0172317 A1 | 7/2009 | Saha et al. |
| 2015/0095008 A1 | 4/2015 | Wang et al. |

OTHER PUBLICATIONS

Hudson, John et al., "A Configurable Random Instruction Sequence (RIS) Tool for Memory Coherence in Multi-Processor Systems," 2014 15th International Microprocessor Test and Verification Workshop, Dec. 2015, pp. 98-101.

Habermann, Christian et al., "Testing a Data Coherency Algorithm," U.S. Appl. No. 15/010,088, filed Jan. 29, 2016, pp. 1-38.

List of IBM Patents or Patent Applications Treated as Related, Jul. 15, 2016, pp. 1-2.

* cited by examiner

TESTING A DATA COHERENCY ALGORITHM

This application is a continuation of co-pending U.S. Ser. No. 15/010,088, entitled "TESTING A DATA COHERENCY ALGORITHM," filed Jan. 29, 2016, which is hereby incorporated herein by reference in its entirety.

BACKGROUND

One or more aspects of the present invention relate in general to data processing systems, and in particular, to testing a data coherency algorithm of a multi-processor environment.

In a multi-processor environment where data can be changed by each single processor core it is necessary to ensure that a single processor does not use outdated data. But to reach the best performance in multi-processor systems it is useful to allow each single processor core to work on old data as long as that single processor core has not used newer data. Traditionally, this coherency rule was tested on real hardware. But as the coherency algorithms that are implemented in modern processor cores are getting more complex, and thus, more error prone, it is important to verify those algorithms before building hardware, in order to reduce development costs. There are other verification methods to test coherency algorithms, but they have not satisfactorily solved the problem.

SUMMARY

Shortcomings of the prior art are overcome and additional advantages are provided through the provision of a method of testing a data coherency algorithm of a multi-processor environment, wherein a simulated multi-processor environment containing one single private cache hierarchy and simulation drivers for all other components of the multi-processor environment is provided. The method includes implementing a global time incremented on a processor cycle and used for timestamping; implementing a transactional execution flag representing a processor core guaranteeing atomicity and coherency of currently executed instructions; implementing a transactional footprint, the transactional footprint keeping an address of each cache line that was used by the processor core, while the processor core is guaranteeing the atomicity and coherency of a transaction; implementing a reference model, the reference model operating on a cache line and keeping a set of timestamps for the cache line, the set comprising a construction date representing a first global timestamp when new data arrives at the private cache hierarchy, and an expiration date representing a second global timestamp when the private cache hierarchy is hit by a cross-invalidation; implementing a core observed timestamp representing a global timestamp, which is an oldest construction date of data used before; implementing interface events that monitor at least one of: a fetch return from the simulated multi-processor environment to update the construction date; a fetch return from an L1 cache to the processor core to update the core observed timestamp; a cross-invalidate from the simulated multi-processor environment to update the expiration date; a transaction start instruction being executed by the processor core to update the transactional execution flag and clear the transactional footprint; or a transaction end instruction being executed by the processor core to perform the checking; and reporting an error based on detecting a transaction end event and finding a cache line in the transactional footprint with an expiration date that is older than or equal to a core observed time.

Systems and computer program products relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

Aspects of the present invention together with the above-mentioned and other objects and advantages may best be understood from the following detailed description of the embodiments, but not restricted to the embodiments, wherein is shown in.

DETAILED DESCRIPTION

Figure 1:
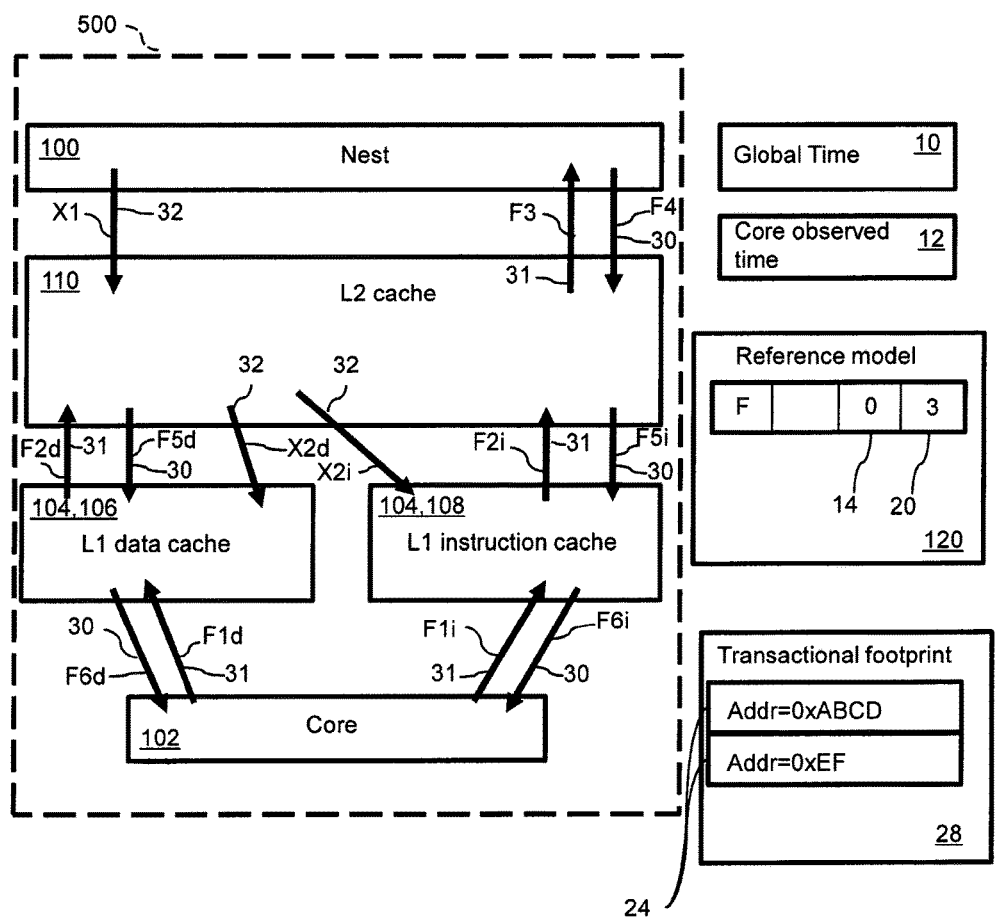
FIG. 1 a block diagram of a device under test in a simulated multi-processor environment according to an embodiment of the invention.

In the drawings, like elements are referred to with equal reference numerals. The drawings are merely schematic representations, not intended to portray specific parameters of aspects of the invention. Moreover, the drawings are intended to depict only typical embodiments of aspects of the invention, and therefore, should not be considered as limiting the scope of aspects of the invention.

The illustrative embodiments described herein provide a method, system, and computer program product for testing a data coherency algorithm of a multi-processor environment. The illustrative embodiments are sometimes described herein using particular technologies only as an example for the clarity of the description. The illustrative embodiments may be used for testing the data coherency algorithm of a multi-processor environment, wherein a simulated multi-processor environment containing one single private cache hierarchy and simulation drivers for all other components of the multi-processor environment is provided.

A multi-processor environment may consist of a communication fabric called nest that embeds several single processor cores. In order to get data, each processor core makes fetch requests to the nest. The smallest data package that may be requested is a cache line that contains several bytes of data. The same cache line is allowed to be used in several processor cores, as long as it is marked as a read-only copy.

If a processor core wants to change a byte in a cache line, it is to get exclusive rights on that cache line. The processor core sends an exclusive fetch request on the cache line to the nest. The nest generates read-only cross-invalidates for all other processor cores and informs the requesting processor core that it is now allowed to change the cache line. The other processor cores can use their old read-only copy of the cache line as long as it is not observable to the outside world, that they have used old data. The usage of an old copy of the cache line is not observable as long as that processor core is only working on cache lines that have not changed their data after the cache line has been changed. This is true for all cache lines that were already stored within the private cache hierarchy of a single processor core when the processor core has received the read-only cross-invalidate for the cache line. So the point in time where a processor core is no longer allowed to work with the cache line is not determined by the read-only cross-invalidate, but by the usage of any other cache line that was received from the nest after the cross-invalidate for the first cache line was received. This is because that second cache line can contain data that allows the outside world to conclude that the processor core used an old copy of the first cache line.

According to an aspect of the invention, a method for testing an implemented sequential consistent cache coherency algorithm of a multi-processor environment is proposed providing data structures to keep track of a sequence of instructions as it is guaranteed by transactional execution and to ensure the atomicity of this sequence. This is a feature to improve performance and ease of use for accessing shared data.

Figure 2:
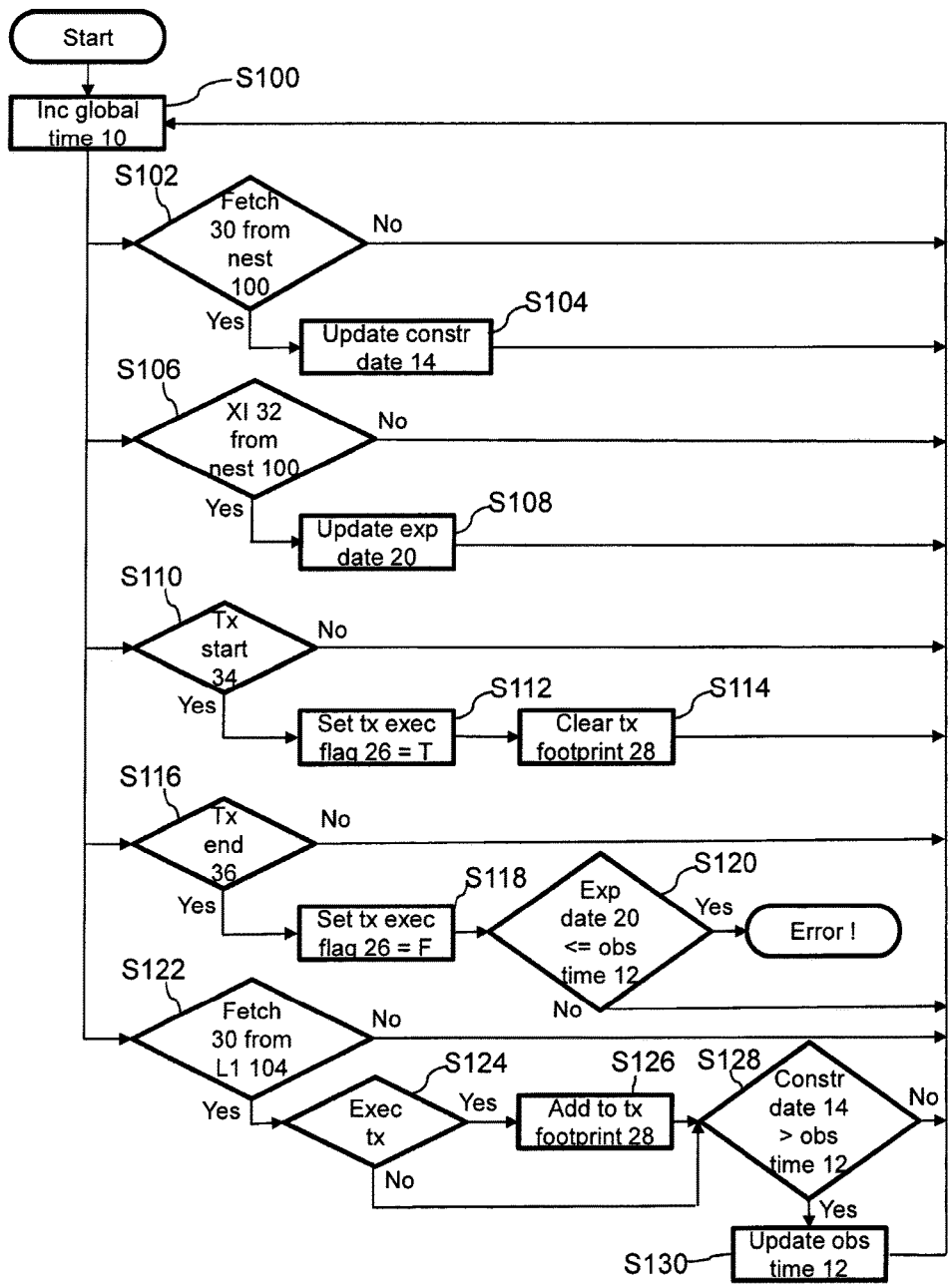
FIG. 2 a flowchart of an example process of the method for testing a data coherency algorithm of a multi-processor environment according to the embodiment of FIG. 1.

In FIG. 1 a block diagram of a device under test in a simulated multi-processor environment 500 using a single processor model according to an embodiment of the invention is shown, whereas in FIG. 2 a flowchart of an example process of the method for testing a data coherency algorithm of a multi-processor environment (FIG. 1) according to the embodiment of FIG. 1 is depicted.

Referring to FIGS. 1 and 2, the simulated multi-processor environment is provided containing one single private cache hierarchy and simulation drivers for all other components of the multi-processor environment. According to one aspect, a global time 10 is implemented, incremented every processor cycle and used for timestamping. A transactional execution flag 26 is implemented, representing the processor core 102 guaranteeing the atomicity and coherency of the currently executed instructions. A transactional footprint 28 is implemented, which keeps the address of each cache line 24 that was used by the processor core 102, while the processor core 102 is guaranteeing the atomicity and coherency of a transaction. A reference model 120 is implemented, which operates on every cache line 24 and keeps a set of timestamps for every cache line 24, the set comprising: a construction date 14 representing a first global timestamp when new data arrives at the private cache hierarchy; and an expiration date 20 representing a second global timestamp when the private cache hierarchy is hit by a cross-invalidation. A core observed timestamp 12 is implemented, representing a global timestamp, which is the oldest construction date 14 of all data used before. Interface events are implemented, that monitor: any fetch return 30 from the simulated multi-processor environment 500 to update the construction date 14; any fetch return 30 from an L1 cache 104 to the processor core 102 to update the global core observed timestamp 12; any cross-invalidate 32 from the simulated multi-processor environment 500 to update the expiration date 20; any transaction start instruction 34 being executed by the processor core 102 to update the transactional execution flag 26 and clear the transactional footprint 28; and any transaction end instruction 36 being executed by the processor core 102 to perform the checking. An error is reported whenever a transaction end event is detected and any cache line 24 is found in the transactional footprint 28 with an expiration date 20, that is older than or equal to the core observed time 12.

Referring to FIG. 1, the device under test (DUT) comprises the L1 cache 104 with the L1 data cache 106 and the L1 instruction cache 108, as well as the L2 cache 110. Two relevant operations for an aspect of the inventive method are shown with the arrows. Arrows F1-F6 show the processing of fetch requests 31 and fetch returns 30. Arrows X1-X2 show the processing of cross-invalidations (XIs) 32.

Fetch requests 31 are generated by a random simulation driver for the single processor core 102, labelled core in the Fig. Operand fetches 31 are issued against the L1 data cache 106 (arrow F1$d$), whereas instruction fetches 31 are issued against the L1 instruction cache 108 (F1$i$). If the L1 cache 104 contains the requested data, the fetch request 31 can be directly answered by the fetch return 30 (F6$d$, F6$i$), if not the fetch request 31 is passed on to the L2 cache 110 (F2$d$, F2$i$). The nest 100 will answer these fetch requests 31 (F4) and the data will be passed by the fetch returns 30 on to the processor core 102 (F5$d$->F6$d$, F5$i$->F6$i$). In addition, the nest 100 is generating random XIs 32 that enter the L2 cache 110 (X1) and are forwarded to the L1 data cache 106 and/or to the L1 instruction cache 108, if they contain the line (X2$d$, X2$i$).

In a real multi-processor environment, a cross-invalidation (XI) 32 for a cache line 24 is generated when another processor core 102 wants to change data within that cache line 24. So, once a processor core 102 receives an XI 32 for a cache line 24 (arrow X1), this cache line 24 might contain old data. In one aspect, whenever a cache line 24 is hit by an XI 32 (arrow X1), the current global time 10 is stored as an expiration date 20 for that cache line 24 in the reference model 120.

As long as the processor core 102 is not using data that was received after the XI 32 for the cache line 24, it cannot be detected whether the cache line 24 was used before the XI 32 was received or after. Therefore, the processor core 102 can keep on working with the cache line 24 even though an XI 32 for the cache line 24 was already received.

Whenever data is returned to the processor core 102 (arrow F6$d$ or F6$i$), the construction date 14 of that data is used to update the core observed time 12, if the construction date 14 is larger than the core observed time 12. Thus, the core observed time 12 holds the construction date 14 of the youngest data that was ever used.

As stated above, modern multi-processor environments allow the individual processor core 102 to work with old data as long as it cannot be observed. Having an expiration date 20 for each cache line 24 that was hit by an XI 32 and a core observed time 12 holding the construction date 14 of the youngest ever used cache line 24 it is possible to check that no old data was used after younger data was seen by the processor core 102. An error is reported whenever the expiration date 20 is older than or equal to the core observed time 12. The check is done whenever data is returned to the processor core 102 (arrow F6).

The transactional footprint 28 keeps the address of each cache line 24 that was used by the processor core 102.

The described transactional memory concept ensures that a transaction is executed atomically. A transaction is started by the transaction start instruction 34 (FIG. 2), followed by any number of other instructions and completed by the transaction end instruction 36 (FIG. 2). The concept of a transactional footprint 28 is introduced to track all cache lines 24 accessed during the transaction. The footprint 28 in combination with core observed time 12, construction time 14 and expiration time 20 enables to achieve the atomicity check. The implementation of the atomicity check is described by an algorithm, comprising: If the processor core 102 executes the transaction start instruction 34, the checking code enters the transactional execution mode by setting a status flag, like the transactional execution flag 26, and clears any old transactional footprint 28. Whenever a cache line 24 is returned from any L1 cache 104 to the processor core 102 while in a transaction, this cache line 24 is added to the transaction footprint 28. If the processor core 102 executes the transaction end instruction, the expiration date 20 of all cache lines 24 of the transactional footprint 28 is compared against the latest core observed time 12. If any expiration date 20 is less than the current core observed time 12, an error is reported, because atomicity has been violated. The atomicity is violated because the processor core 102 used data which was newer than data already accessed in the transaction which got modified in the meantime by another processor core.

Referring to the flowchart in FIG. 2, a simulation cycle starts with step S100 with incrementing the global time 10. Steps S102, S106, S110, S116, S122 may be executed independently from each other resulting in a return to step S100 for the next simulation cycle.

If a fetch return 30 from the nest 100 delivers the cache line 24, step S102, in step S104 the construction date 14 is updated in the reference model 120 with the current value of the global time 10; otherwise, the global time 10 is incremented in step S100 again at the end of the simulation cycle.

If an XI 32 is executed from the nest 100 in step S106, the expiration date 20 of the cache line 24 in the reference model 120 is updated in step S108 with the current value of the global time 10; otherwise the global time is incremented in step S100 again at the end of the simulation cycle.

If a fetch return 30 from the L1 cache 104 to the processor core 102 delivers a cache line 24 in step S122, the transactional execution flag 26 is checked in step S124. If this is positive, the address of the cache line 24 is added to the transactional footprint 28 in step S126. Next, in any case, it is checked in step S128, if the construction date 14 is younger than the core observed time 12. If this is the case, the global core observed timestamp 12 is updated with the construction date 14 in step S130. Otherwise, the global time 10 is incremented at the end of the simulation cycle.

If a transaction start instruction 34 is set in step S110, then the transaction execution flag 26 is set to true in step S112 and the transactional footprint 28 is cleared in step S114. Otherwise, the global time 10 is incremented at the end of the simulation cycle.

If a transaction end instruction 36 is set in step S116, the transactional execution flag 26 is set to false in step S118. Then, in step S120 it is checked if there is any cache line 24 in the transactional footprint 24 with a construction date 14 being older than or equal to the core observed time 12. If this is the case, an error is reported. Otherwise, the global time 10 is incremented at the end of the simulation cycle.

Figure 3:
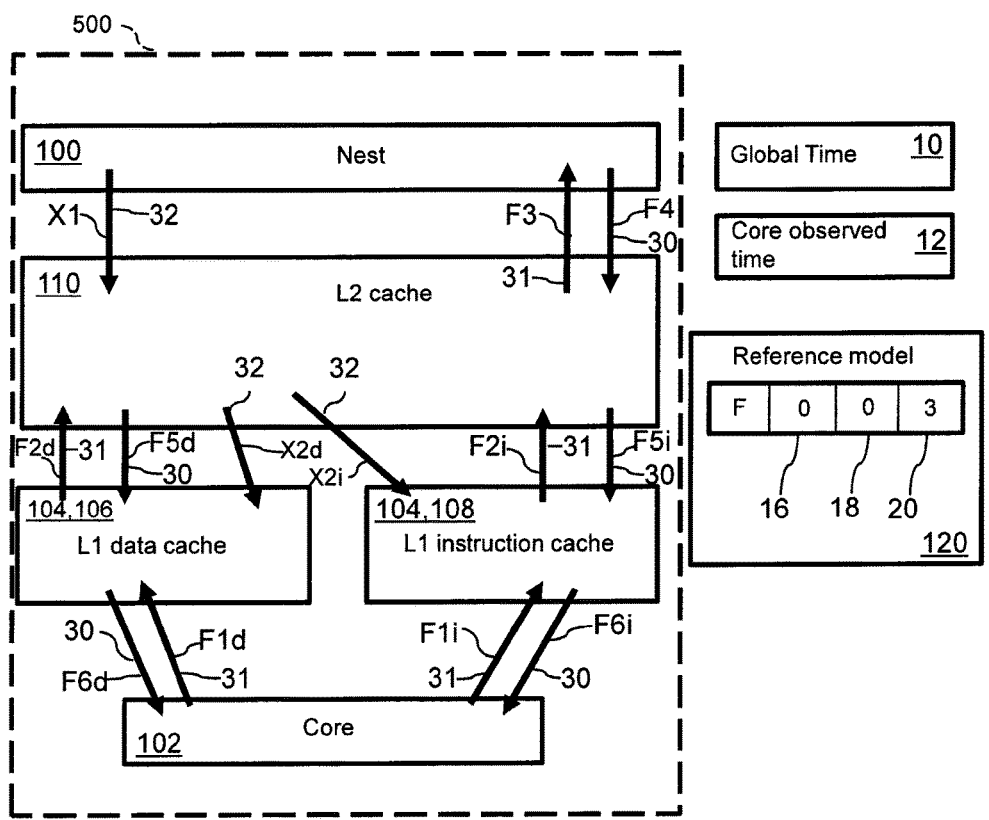
FIG. 3 a block diagram of a device under test in the simulated multi-processor environment according to a further embodiment of the invention.
Figure 4:
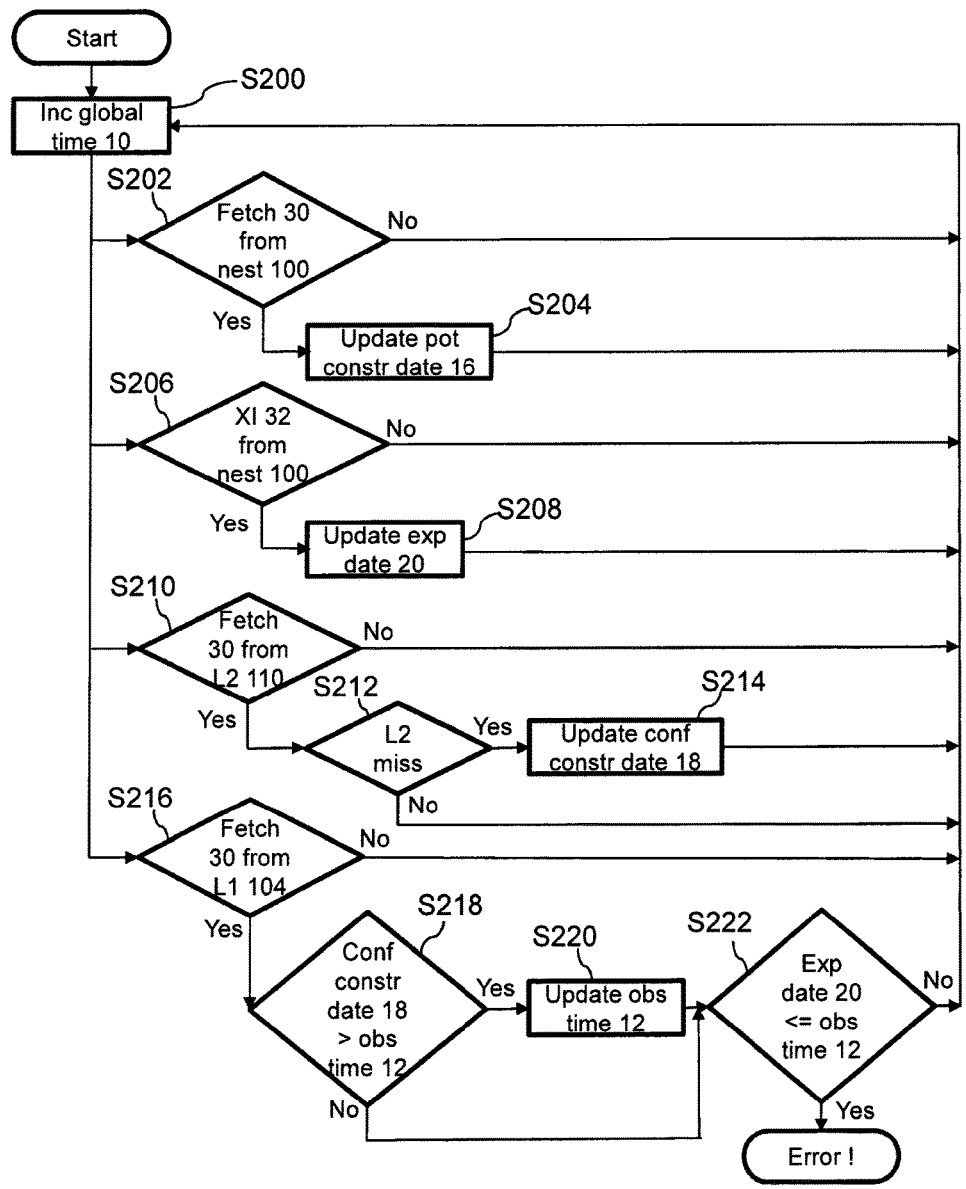
FIG. 4 a flowchart of an example process of the method for testing a data coherency algorithm of a multi-processor environment according to the further embodiment of the invention.

In FIG. 3, a block diagram of a device under test in the simulated multi-processor environment 500 according to a further embodiment of the invention is shown, whereas in FIG. 4, a flowchart of an example process of the method for testing a data coherency algorithm of a multi-processor environment (FIG. 3) according to the further embodiment of FIG. 3 is depicted.

According to the embodiment, the global time 10 is implemented, incremented every processor cycle and used for timestamping. The reference model 120 is implemented, which operates on every cache line 24 and keeps the set of timestamps for every cache line 24, the set comprising: a potential construction date 16 representing a first global timestamp when new data arrives at the private cache hierarchy; a confirmed construction date 18 representing a second global timestamp confirming usage of new data by the processor core; the expiration date 20 representing a third global timestamp when the private cache hierarchy is hit by a cross-invalidation. The core observed timestamp 12 is implemented, representing the global timestamp, which is the oldest confirmed construction date of all data used before. Interface events are implemented, that monitor: any fetch return 30 from the simulated multi-processor environment 500 to update the potential construction date 16; any fetch return 30 from an L2 cache 110 to the L1 cache 104 to update the confirmed construction date 18; any fetch return 30 from the L1 cache 104 to the processor core 102 to update the global core observed timestamp 12; any cross-invalidate 32 from the simulated multi-processor environment 500 to update the expiration date 20. An error is reported, whenever data is used in the processor pipeline with an expiration date 20 that is older than or equal to the core observed time.

Referring to FIG. 3, the device under test (DUT) comprises the L1 cache 104 with the L1 data cache 106 and the L1 instruction cache 108, as well as the L2 cache 110. Two relevant operations for an aspect of the inventive method are shown with the arrows. Arrows F1-F6 show the processing of fetch requests 31 and fetch returns 30. Arrows X1-X2 show the processing of cross-invalidations (XIs) 32.

Arrows F1-F6 show the processing of fetch requests 31. Arrows X1-X2 show the processing of cross-invalidations (XIs) 32.

Fetch requests 31 are generated by the random simulation driver for a single processor core 102, labelled core in the Fig. Operand fetches 31 are issued against the L1 data cache 106 (arrow F1d), whereas instruction fetches 31 are issued against the L1 instruction cache 108 (F1i). If the L1 cache 104 contains the requested data, the fetch 31 can be directly answered by the fetch return 30 (F6d, F6i); if not, the fetch request 31 is passed on to the L2 cache 110 (F2d, F2i). If a speculative fetch engine is available, then a fetch request 31 to the simulation driver of the multi-processor environment 500, called nest (F3), will occur independently of the L2 directory state. If the L2 cache 110 contains the data, the L2 fetch request 31 is answered by the fetch return 30 (F5d, F5i) and the nest response (F4) for the speculative request is dropped. If the L2 cache 110 does not contain the requested data and no speculative request had been issued, a fetch request 31 is passed on to the nest 100 (F3). The nest 100 will answer these fetch requests 31 (F4) and the data will be passed on to the processor core 102 (F5d->F6d, F5i->F6i). In addition, the nest 100 is generating random XIs 32 that enter the L2 cache 110 (X1) and are forwarded to the L1 data cache 106 and/or to the L1 instruction cache 108 if they contain the cache line 24 (X2d, X2i).

In a real multi-processor environment, a cross-invalidation (XI) 32 for a cache line 24 is generated when another processor core wants to change data within that cache line 24. Therefore, once a processor core receives an XI 32 for the cache line 24 (arrow X1) this cache line 24 might contain old data. In one aspect, whenever a cache line 24 is hit by an XI 32 (arrow X1), the current global time 12 is stored as an expiration date 20 for that cache line 24 in the reference model 120.

As long as the processor core 102 is not using data that was received after the XI 32 for the cache line 24, it cannot be detected whether the cache line 24 was used before the XI 32 was received or after. Therefore, the processor core 102 can keep on working with the cache line 24 even though an XI 32 for the cache line 24 was already received.

If new data is received from the nest 100 (arrow F4), the current global time 10 is stored as the potential construction date 16 of that cache line 24, independently if this was a speculative request or not. If the nest 100 return data is later passed on to the requesting L1 cache 104 (F5), the potential construction date 108 becomes the confirmed construction date 18. If the data is returned from the L2 cache 110 to the requesting unit (F5), the potential construction date 108 is ignored and the confirmed construction date 18 remains unchanged.

Whenever data is returned to the processor core 102 (arrow F6d or F6i), the confirmed construction date 18 of that data is used to update the core observed time 12, if the confirmed construction date 18 is newer than the core observed time 12. Thus, the core observed time 12 holds the confirmed construction date 18 of the youngest data that was ever used.

As stated above, modern multi-processor environments allow the individual processor core 102 to work with old data as long as it cannot be observed. Having an expiration date 20 for each cache line 24 that was hit by an XI 32 and a core observed time 12 holding the confirmed construction date 18 of the youngest ever used cache line 24, it is possible to check that no old data was used after younger data was seen by the processor core 102.

The check is, if the expiration date 20 is older than or equal to the core observed time 12. If this is the case, an error is reported. The check is done whenever data is returned to the processor core 102 (arrow F6).

Referring to the flowchart in FIG. 4, a simulation cycle starts with step S200 with incrementing the global time 10. Steps S202, S206, S210, S216 may be executed independently from each other resulting in a return to step S200 for the next simulation cycle.

If a fetch return 30 from the nest 100 delivers the cache line 24, step S202, in step S204 the potential construction date 16 is updated in the reference model 120 with the current value of the global time 10; otherwise, the global time is incremented in step S200 again at the end of the simulation cycle.

If an XI 32 is executed from the nest 100 in step S206, the expiration date 20 of the cache line 24 in the reference model 120 is updated in step S208 with the current value of the global time 10; otherwise, the global time is incremented in step S200 again at the end of the simulation cycle.

If a fetch return 30 from the L2 cache 110 to the L1 cache 104 delivers the cache line 24 in step S210, first it is checked for an L2 miss response in step S212. If this is the case, the confirmed construction date 18 of the cache line 24 is updated in the reference model 120 in step S214 with the value from the potential construction date 16 of the cache line 24. Otherwise, the global time is incremented in step S200 again at the end of the simulation cycle.

If a fetch return 30 from the L1 cache 104 to the processor core 102 delivers a cache line 24 in step S216, it is then checked, if the confirmed construction date 18 is newer than the core observed time 12. If this is the case, the core observed time 12 is updated with the confirmed construction time 18 of the cache line 24. Then, or otherwise, it is checked, if the expiration date 20 of the cache line 24 is older than or equal to the core observed time 12. If this is the case, an error is reported. Otherwise, the global time is incremented in step S200 again at the end of the simulation cycle.

Figure 5:
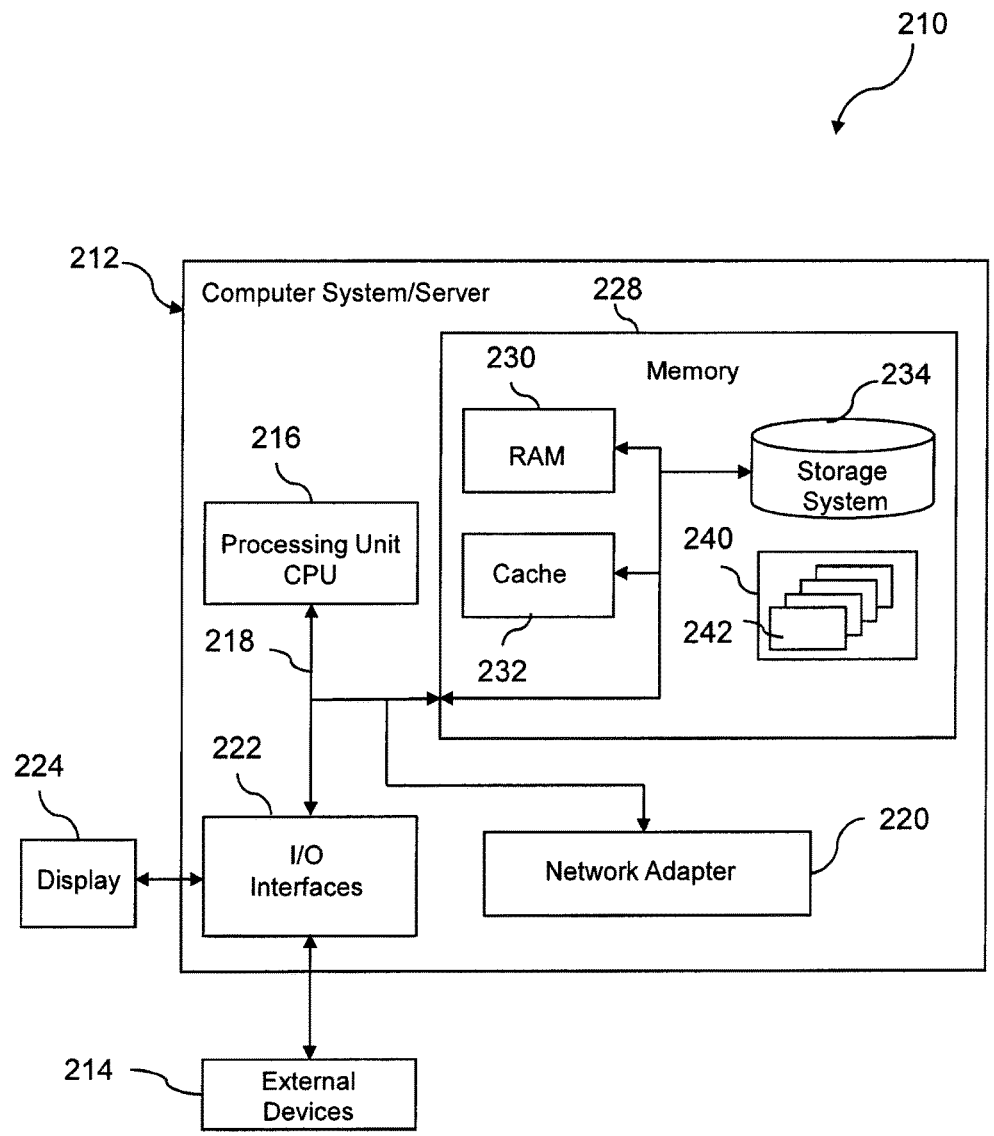
FIG. 5 an example embodiment of a data processing system for executing a method according to aspects of the invention.

Referring now to FIG. 5, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210, there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

As described herein, a method is provided for testing a data coherency algorithm of a multi-processor environment, wherein a simulated multi-processor environment containing one single private cache hierarchy and simulation drivers for all other components of the multi-processor environment is provided. The method comprises implementing a global time incremented every processor cycle and used for timestamping; implementing a transactional execution flag representing a processor core guaranteeing the atomicity and coherency of the currently executed instructions; and implementing a transactional footprint, which keeps the address of each cache line that was used by the processor core, while the processor core is guaranteeing the atomicity and coherency of a transaction. A reference model is implemented, which operates on every cache line and keeps a set of timestamps for every cache line, the set comprising: a construction date representing a first global timestamp when new data arrives at the private cache hierarchy; and an expiration date representing a second global timestamp when the private cache hierarchy is hit by a cross invalidation. A core observed timestamp is implemented representing a global timestamp, which is the oldest construction date of all data used before. Interface events are implemented that monitor: any fetch return from the simulated multi-processor environment to update the construction date; any fetch return from an L1 cache to the processor core to update the global core observed timestamp; any cross-invalidate from the simulated multi-processor environment to update the expiration date; any transaction start instruction being executed by the processor core to update the transactional execution flag and clear the transactional footprint; any transaction end instruction being executed by the processor core to perform the checking. An error is reported whenever a transaction end event is detected and any cache line is found in the transactional footprint with an expiration date that is older than or equal to the core observed time.

According to an aspect of the invention a method on top of timestamp based coherency checking is provided for verification. Cache line based transaction footprint tracking and checking against timestamps is added. Atomicity within a transaction is ensured.

The transactional memory concept guarantees that a transaction is executed atomically. The transaction is started by the transaction start instruction, followed by any number of other instructions and completed by the transaction end instruction. The concept of the transactional footprint is introduced to track all cache lines accessed during the transaction. The footprint in combination with the core observed time, construction time and expiration time enables to achieve the atomicity check.

According to an aspect, the implementation of the atomicity check is described by an algorithm, comprising:

If the processor core executes the transaction start instruction, the checking code enters the transactional execution mode by setting a status flag, like the transactional execution flag and clears any old transactional footprint. Whenever a cache line is returned from any L1 cache to the processor core while in a transaction, this cache line is added to the transaction footprint. If the processor core executes the transaction end instruction, the expiration date of all cache lines of the transaction footprint is compared against the latest core observed time. If any expiration date is less than the current core observed time, an ERROR is reported, because atomicity has been violated. The atomicity is violated, because the processor core used data which was newer than data already accessed in the transaction which got modified in the meantime by another processor core.

Further, a computer program product is provided for testing a data coherency algorithm of a multi-processor environment, wherein a simulated multi-processor environment containing one single private cache hierarchy and simulation drivers for all other components of the multi-processor environment is provided. The computer program product includes a computer readable storage medium having program instructions embodied therewith, the program instructions executable by a computer to cause the computer to perform a method comprising: implementing a global time incremented every processor cycle and used for timestamping; implementing a transactional execution flag representing a processor core guaranteeing the atomicity and coherency of the currently executed instructions; implementing a transactional footprint, which keeps the address of each cache line that was used by the processor core, while the processor core is guaranteeing the atomicity and coherency of a transaction; implementing a reference model, which operates on every cache line and keeps a set of timestamps for every cache line, the set comprising: a construction date representing a first global timestamp when new data arrives at the private cache hierarchy; and an expiration date representing a second global timestamp when the private cache hierarchy is hit by a cross-invalidation; implementing a core observed timestamp representing a global timestamp, which is the oldest construction date of all data used before; implementing interface events that monitor: any fetch return from the simulated multi-processor environment to update the construction date; any fetch return from an L1 cache to the processor core to update the global core observed timestamp; any cross-invalidate from the simulated multi-processor environment to update the expiration date; any transaction start instruction being executed by the processor core to update the transactional execution flag and clear the transactional footprint; and any transaction end instruction being executed by the processor core to perform the checking; reporting an error whenever a transaction end event is detected and any cache line is found in the transactional footprint with an expiration date, that is older than or equal to the core observed time.

Further, a data processing system for execution of a data processing program is provided, comprising computer readable program instructions for performing the method described above.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of aspects of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of testing a data coherency algorithm of a multi-processor environment, wherein a simulated multi-processor environment containing a private cache hierarchy and simulation drivers for other components of the multi-processor environment is provided, the method comprising:
    implementing a global time incremented on a processor cycle and used for timestamping;
    implementing a transactional execution flag representing a processor core guaranteeing atomicity and coherency of currently executed instructions;
    implementing a transactional footprint, the transactional footprint keeping an address of each cache line that was used by the processor core, while the processor core is guaranteeing the atomicity and coherency of a transaction;
    implementing a reference model, the reference model operating on a cache line and keeping a set of timestamps for the cache line, the set comprising a construction date representing a first global timestamp when new data arrives at the private cache hierarchy, and an expiration date representing a second global timestamp when the private cache hierarchy is hit by a cross-invalidation;
    implementing a core observed timestamp representing a global timestamp, which is an oldest construction date of data used before;
    implementing interface events that monitor at least one of:
        a fetch return from the simulated multi-processor environment to update the construction date;
        a fetch return from an L1 cache to the processor core to update the core observed timestamp;
        a cross-invalidate from the simulated multi-processor environment to update the expiration date;
        a transaction start instruction being executed by the processor core to update the transactional execution flag and clear the transactional footprint; or
        a transaction end instruction being executed by the processor core to perform the checking; and
    reporting an error based on detecting a transaction end event and finding a cache line in the transactional footprint with an expiration date that is older than or equal to a core observed time.

2. The method according to claim 1, wherein the set further comprises a potential construction date representing a third global timestamp when new data arrives at the private cache hierarchy, and a confirmed construction date representing a fourth global timestamp confirming usage of new data by the processor core; and
    wherein the interface events further monitor at least one of:
        a fetch return from the simulated multi-processor environment to update the potential construction date; or
        a fetch return from an L2 cache to the L1 cache to update the confirmed construction date.

3. The method according to claim 2, further comprising reporting an error based on data being used with an expiration date that is older than or equal to the core observed time.

4. The method according to claim 2, further comprising based on the fetch return from the simulated multi-processor environment, updating the potential construction date in the reference model with the global time.

5. The method according to claim 2, further comprising based on a missed fetch return from the L2 cache to the L1 cache, updating the confirmed construction date in the reference model with the potential construction date of the cache line.

6. The method according to claim 2, further comprising based on a fetch return from the L1 cache to the processor core, updating the core observed timestamp with the confirmed construction date of the cache line.

7. The method according to claim 2, further comprising based on a cross-invalidate from the simulated multi-processor environment, updating the expiration date in the reference model with the global time.

8. The method according to claim 1, further comprising based on a fetch return from the simulated multi-processor environment, updating the construction date in the reference model with the global time.

9. The method according to claim 1, further comprising based on a fetch return from the L1 cache to the processor core, checking for the transactional execution flag.

10. The method according to claim 1, further comprising based on a fetch return from the L1 cache to the processor core, adding a cache line to the transactional footprint.

11. The method according to claim 1, further comprising based on a fetch return from the L1 cache to the processor core, updating the core observed timestamp with the construction date.

12. The method according to claim 1, further comprising based on a cross-invalidate from the simulated multi-processor environment, updating the expiration date in the reference model with the global time.

13. The method according to claim 1, further comprising based on the transaction end instruction, setting the transactional execution flag to false.

* * * * *